US006941007B1

(12) United States Patent  (10) Patent No.: US 6,941,007 B1
Do  (45) Date of Patent: Sep. 6, 2005

(54) PATTERN RECOGNITION WITH THE USE OF MULTIPLE IMAGES

(75) Inventor: Douglas D. Do, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/493,663

(22) Filed: Jan. 28, 2000

(51) Int. Cl.⁷ .............................................. G06K 9/00
(52) U.S. Cl. ....................... 382/145; 382/143; 382/144
(58) Field of Search ........................ 382/141, 143–151; 348/86, 87, 125, 126; 356/237.1, 237.7, 237.4, 356/237.5; 378/62

(56) References Cited

U.S. PATENT DOCUMENTS

| | | | |
|---|---|---|---|
| 4,579,455 A | * | 4/1986 | Levy et al. ................. 356/394 |
| 4,794,646 A | | 12/1988 | Takeuchi et al. |
| 5,057,689 A | | 10/1991 | Nomura et al. |
| 5,568,563 A | | 10/1996 | Tanaka et al. |
| 5,641,960 A | | 6/1997 | Okubo et al. |
| 5,659,172 A | | 8/1997 | Wagner et al. |
| 5,764,793 A | | 6/1998 | Omae et al. |
| 5,822,055 A | | 10/1998 | Tsai et al. |
| 5,917,588 A | * | 6/1999 | Addiego ................... 356/237.2 |
| 6,178,223 B1 | * | 1/2001 | Solomon et al. ............... 378/62 |
| 6,483,937 B1 | * | 11/2002 | Samuels ..................... 382/144 |

* cited by examiner

Primary Examiner—Vikkram Bali
(74) Attorney, Agent, or Firm—Dickstein Shapiro Morin & Oshinsky LLP (57) ABSTRACT

A pattern inspection apparatus and method that uses multiple images in a pattern recognition process used to detect defects in an object being inspected is disclosed. A user is provided with multiple image selection windows allowing the user to select multiple desired images from the object to form a pattern to be recognized within the object. The multiple desired images will be substantially free from undesired features of the object. Once the multiple desired images are selected, the spatial relationship between them is determined and used to learn the pattern to be recognized. The spatial relationship between the desired images further filters out undesired features. The pattern to be recognized is used in a subsequent pattern recognition analysis. Since the pattern to be recognized includes only desired images and their relationship, undesired features that could corrupt the pattern recognition analysis are not present during the analysis.

39 Claims, 11 Drawing Sheets

INSPECTED IMAGES
(THREE IMAGES SELECTED)

PATTERN RECOGNITION WITH THE USE OF MULTIPLE IMAGES

BACKGROUND OF THE INVENTION

1. Field of the Invention

The present invention relates to the field of semiconductor fabrication and, more particularly to a method and apparatus that uses multiple images in a pattern recognition process used to detect defects in the manufacture of a semiconductor device.

2. Description of the Related Art

In the semiconductor industry, there is a continuing movement towards higher integration, density and production yield, all without sacrificing throughput or processing speed. The making of today's integrated circuits (ICs) requires a complex series of fabrication, inspection and testing steps interweaved throughout the entire process to ensure the proper balance between throughput, processing speed and yield. The inspections and tests are designed to detect unwanted variations in the wafers produced, as well as in the equipment and masks used in the fabrication processes. One small defect in either the devices produced or the process itself can render a finished device inoperable.

Many of the inspection steps once done manually by skilled operators have been automated. Automated systems increase the process efficiency and reliability as the machines performing the inspection are more consistent than human operators who vary in ability and experience and are subject to fatigue when performing repetitive tasks. The automated systems also provide greater amounts of data regarding the production and equipment, which enables process engineers to both better analyze and control the process.

One such automated inspection step is known as pattern recognition or pattern inspection. Many different "patterns" appear on both the wafer and the masks used to produce the ICs. Typical pattern inspection systems are image based, as described, for example, in U.S. Pat. Nos. 4,794,646; 5,057,689; 5,641,960; and 5,659,172. In U.S. Pat. No. 4,794,646, for example, the wafer, or part thereof, is scanned and a highly resolved picture or image of the pertinent "pattern" is obtained. This pattern image is compared to other pattern images retrieved from the same or other wafers, or is compared to an ideal image stored in the inspection system database. Differences highlighted in this comparison identify possible defects in the IC or wafer.

Figure 1:
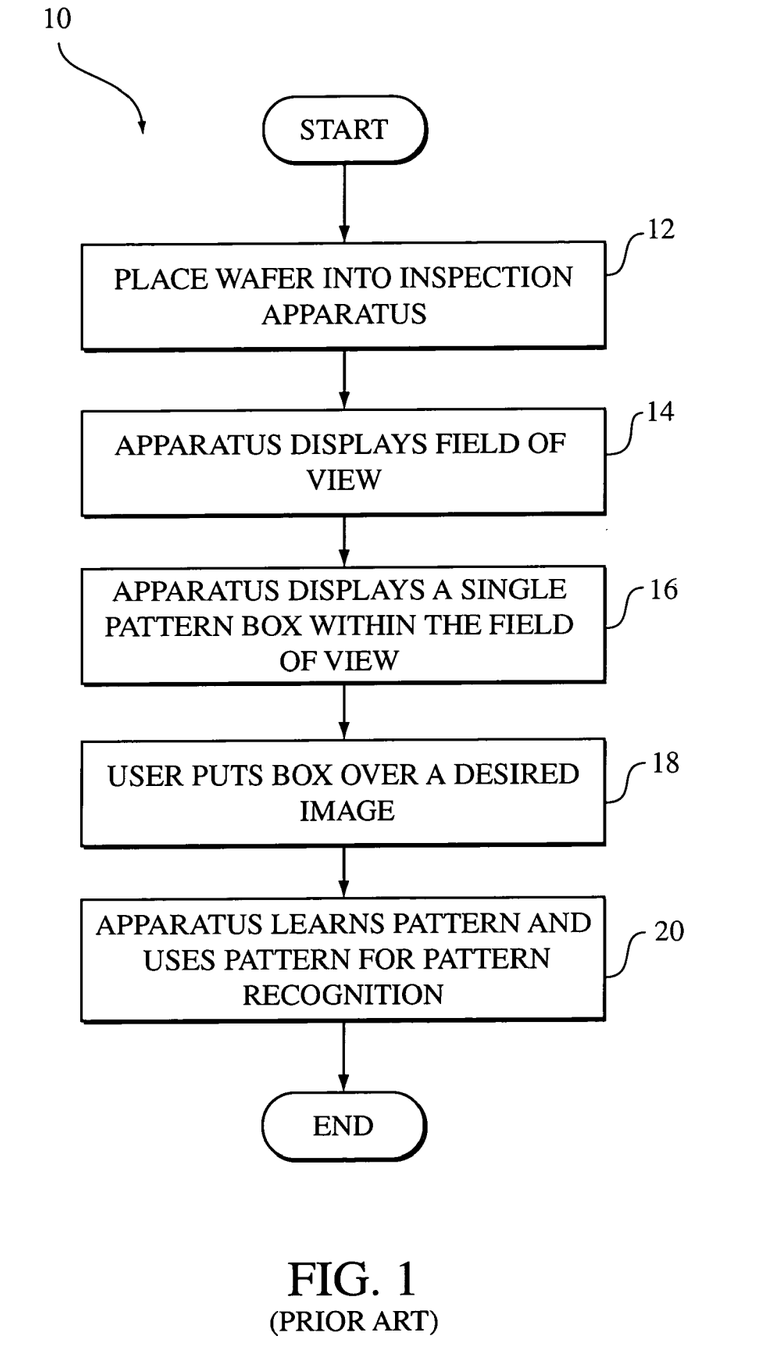
FIG. 1 illustrates in flowchart form a conventional pattern recognition process.

FIG. 1 illustrates the conventional pattern recognition method 10 currently performed by today's pattern recognition or pattern inspection tools. The method 10 begins when a user places a wafer or other object to be inspected into the inspection apparatus (step 12). After scanning the wafer, the apparatus displays a "field of view" containing images from a portion of the scanned wafer (step 14). These images are to be inspected by the apparatus and thus, are referred to herein as the "inspected images." The apparatus then displays a single pattern box within the field of view (step 16). This pattern box will be used by an operator of the apparatus to select a desired image from the inspected image. The selection is made by placing the pattern box over an image currently displayed in the field of view (step 18). The apparatus "learns" the pattern of the selected image and subsequently uses the learned pattern in a pattern recognition analysis to determine if the wafer has any defects (step 20). The use of "learns" or "learned" herein refers to the process of obtaining pattern information for the selected image and storing the information for subsequent use in a pattern recognition or critical dimension (CD) analysis. The process of learning a pattern and performing a pattern recognition analysis is well known and can be carried out in any known manner.

Figure 2:
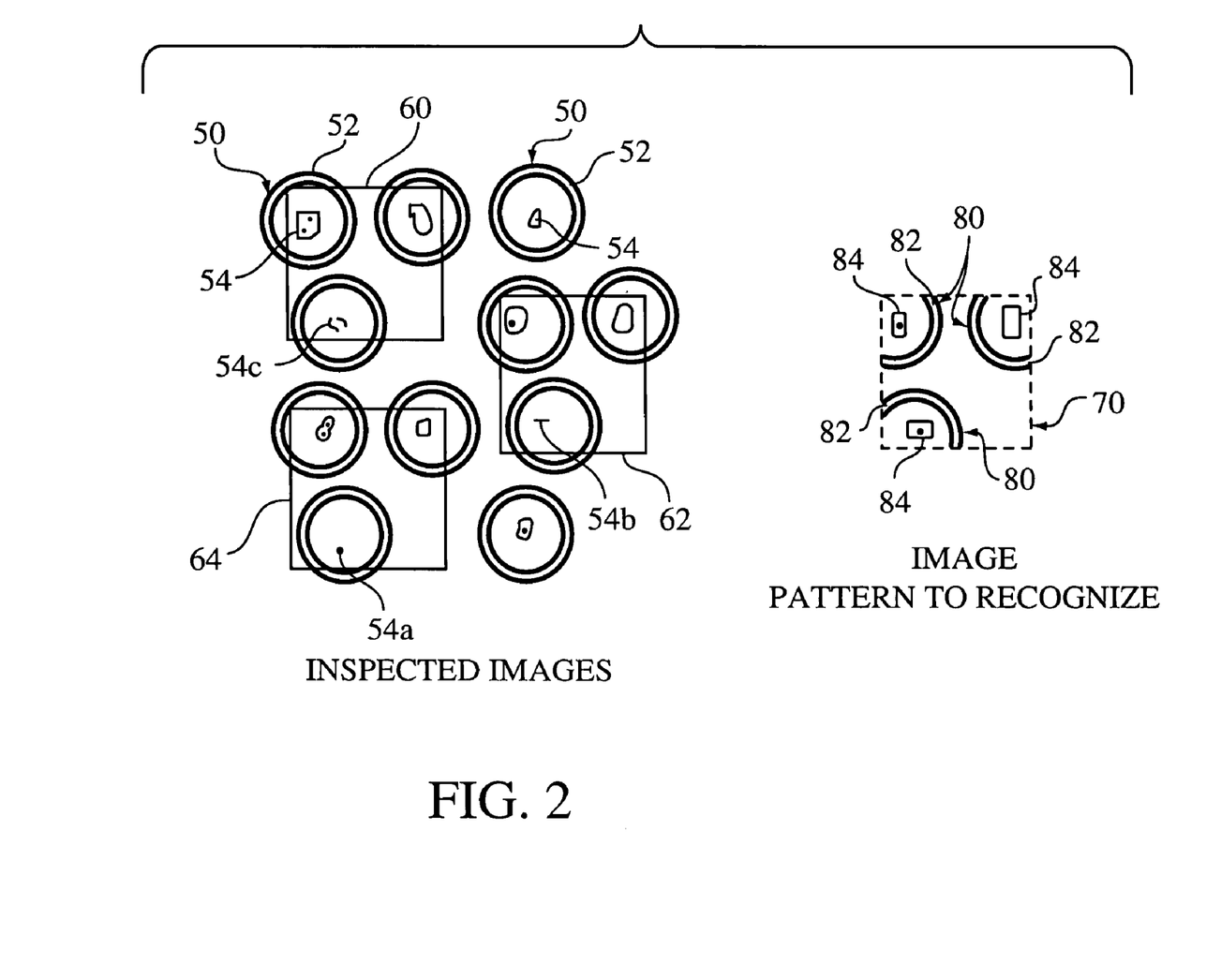
FIG. 2 illustrates exemplary inspected images and a pattern to be recognized used in the process illustrated in FIG. 1.

The method 10, however, is not without its shortcomings. Referring to FIG. 2, exemplary inspected images 50 are illustrated. In this example, the images 50 are contacts formed within a wafer being inspected. Each image 50 contains a top surface 52 of the contact and a bottom surface 54 of the contact. The bottom surfaces 52 are the desired features, which must be inspected for defects. Typical defects include under etching and over etching of the contacts and what is sometimes referred to as "closed contacts," which are partially etched contacts.

As can be seen from FIG. 2, the top surfaces 52 are larger and much more prominent than the bottom surfaces 54. Often times, the inspection apparatus receives such strong signals from the contact top surfaces 52 that it is difficult to detect and properly inspect the contact bottom surfaces 54, which, as described above, are the desired features. By way of example, it is presumed that during the method 10 (FIG. 1) the operator placed a pattern box 70 over an image comprised of contact images 80. The selected image and its pattern found within box 70 will be hereinafter referred to as the "pattern to recognize." Like the images 50 to be inspected, the images 80 of the pattern to be recognized contain top surfaces 82 and bottom surfaces 84. In this example, the user selected pattern to be recognized contains three contact bottom surfaces 84, each with their own expected or desired shape. The user selected pattern to be recognized also contains portions of three top surfaces 82 that are much larger than the bottom surfaces 84. The inspection apparatus learns the pattern to be recognized, which includes large signals associated with the top surfaces 82, and subsequently uses the learned pattern for comparison with the inspected images, the apparatus detects three matches 60, 62, 64.

As can be seen from FIG. 2, the three declared matches 60, 62, 64 do not contain bottom surfaces 54 that match the bottom surfaces 84 of the pattern to be recognized. Moreover, some of the matches 60, 62, 64 contain defects, e.g., under etched bottom surfaces 54a, 54b, 54c. Thus, the apparatus has incorrectly detected three matches 60, 62, 64, when there should have been zero matches and more importantly, the apparatus failed to detect three defects 54a, 54b, 54c. This anomaly occurs since the apparatus receives such strong signals from the much larger and much more prominent top surfaces 52, 82, which substantially match each other. By contrast, the apparatus receives weaker signals from the much smaller and less prominent bottom surfaces 54, 84, which do not match each other and also contain defects. Since there is much more information associated with the top surfaces 52, 82 than the bottom surfaces 54, 84, the apparatus detects the matches 60, 62, 64 based on the top surfaces 52, 82, which results in improper pattern recognition results.

Typically, the inspection apparatus will allow a user to set pattern recognition thresholds. These thresholds are designed to reduce or increase the matching percentage required between the pattern to be recognized and the inspected images. Thus, a user may set a matching threshold to 100%, in which case, the apparatus will only declare matches when the inspected images contain patterns that exactly match the pattern to be recognized. This would ensure that defective images 54a, 54b, 54c are not matched to desired and non-defective images. However, due to variations in the manufacturing process, a matching threshold of 100% would most likely lead to no desired matches or too few desired matches than are actually present. The apparatus would not detect all of the proper matches, if it detects any at all (i.e., it is under inclusive). On the other hand, if the matching threshold is set too low, e.g., 50%, then too many matches will occur. These matches will include defective images 54a, 54b, 54c whose patterns are within the matching percentage (i.e., it is over inclusive). Typically, the matching threshold is set to approximately 65% to balance between the over inclusive and under inclusive matching thresholds.

Figure 3:
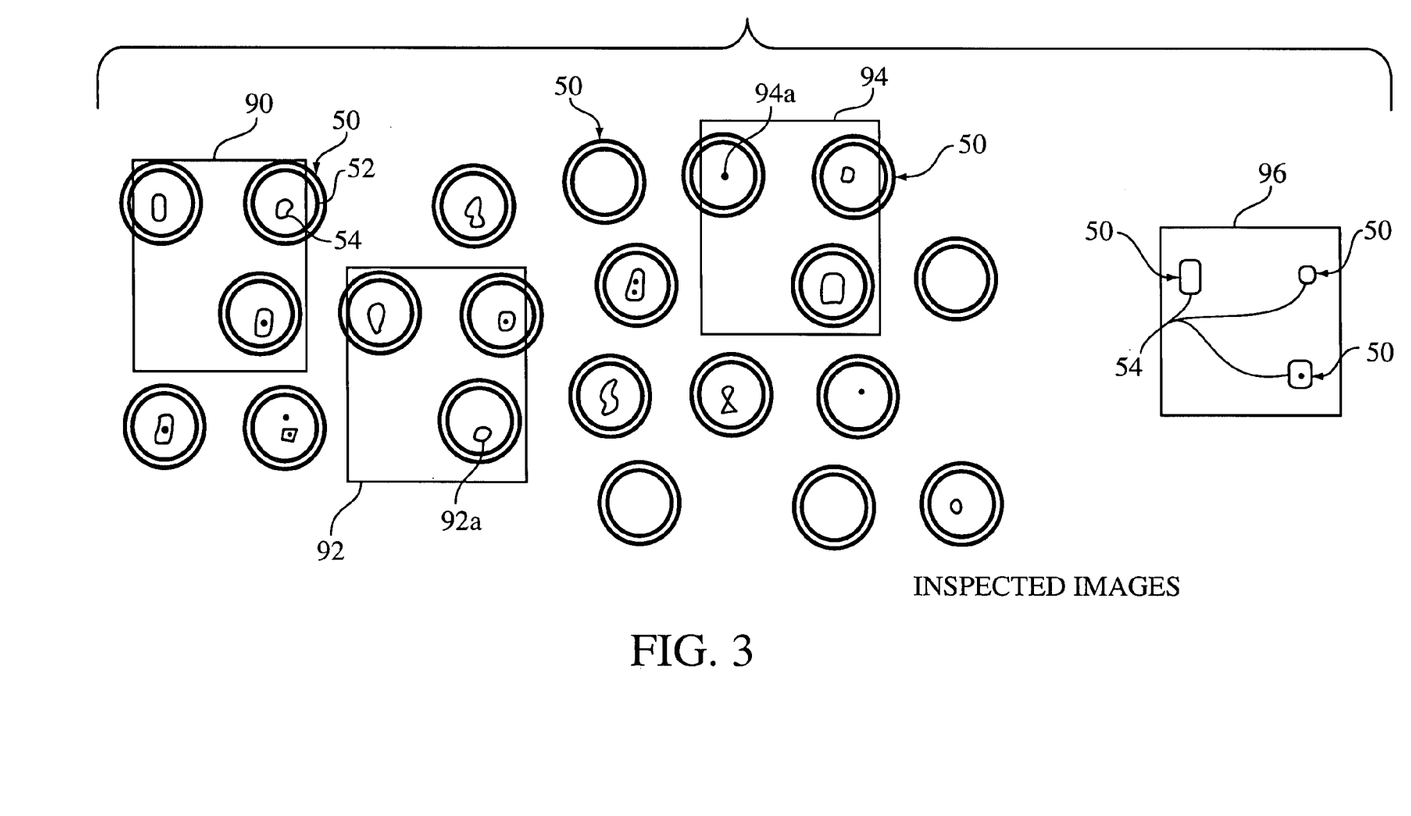
FIG. 3 illustrates exemplary inspected images used in the process illustrated in FIG. 1.

Even with a threshold setting of 65%, the conventional pattern recognition process is still unreliable. FIG. 3 illustrates another set of exemplary inspected images 50. Four sample images 90, 92, 94, 96 are also illustrated. The sample images 90, 92, 94, 96 each contain three contact images 50. The first three images 90, 92, 94 contain top surfaces 52 and bottom surfaces 54, while the fourth image 96 only contains bottom surfaces 54. The second and third images 92, 94 also contain defective bottom surfaces 92a, 94a, respectively. Using the current pattern recognition process, the first three images 90, 92, 94 would most likely match each other if one of the images 90, 92, 94 were used as a pattern to be recognized. This would happen even though the bottom surfaces 54 of the images 90, 92, 94 do not match at all and some of the surfaces 92a, 94a are defective.

It would be desirable to use the fourth sample image 96 as the pattern to be detected. As noted above, the fourth image 96 does not contain any top surfaces 52. However, the fourth sample image 96, which has bottom surfaces 54 substantially matching the bottom surfaces 54 of the first sample image 90, would not match any of the other images 90, 92, 94 because the other images contain both top and bottom surfaces 52, 54. Thus, even if it were possible to select the fourth sample image 96 as a pattern to be recognized, the pattern recognition analysis would be corrupted by the top surfaces 52, of the inspected images (e.g., images 90, 92, 94) which are not part of the desired features.

Accordingly, there is a desire and need for a pattern recognition process that filters out undesirable features from the object being inspected prior to performing a pattern recognition analysis on the object. There is also a desire and need for a pattern recognition process that allows a user to select multiple desired images of the object being inspected to be used as a pattern to be recognized during a pattern recognition analysis on the object.

SUMMARY OF THE INVENTION

The present invention provides a pattern recognition technique that substantially filters out undesirable features of the object being inspected prior to performing a pattern recognition analysis on the object.

The present invention also provides a pattern recognition technique that allows multiple desired images of the object being inspected to be used as a pattern to be recognized during a pattern recognition analysis on the object.

The above and other features and advantages of the invention are achieved by a pattern inspection apparatus and method that uses multiple images in a pattern recognition process used to detect defects in an object being inspected. A user is provided with multiple image selection windows allowing the user to select multiple desired images from the object to form a pattern to be recognized within the object. The multiple desired images will be substantially free from undesired features of the object. Once the multiple desired images are selected, the relationship between them is determined and used to learn the pattern to be recognized. The relationships between the desired images further filters out undesired features. The pattern to be recognized is used in a subsequent pattern recognition analysis. Since the pattern to be recognized includes only desired images and their relationship, undesired features that could corrupt the pattern recognition analysis are not present during the analysis. Thus, the apparatus and method are more accurate than prior inspection tools.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Figure 4:
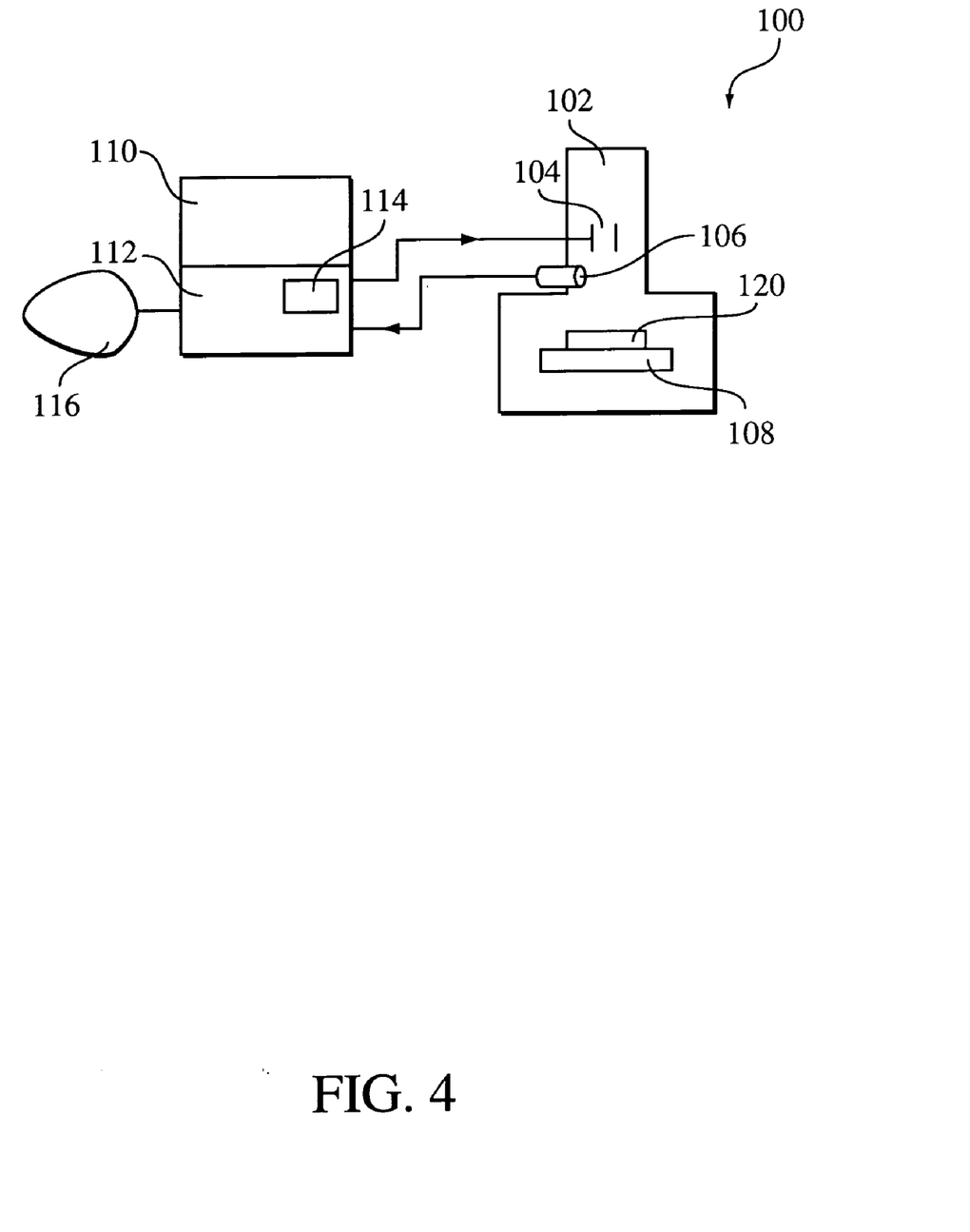
FIG. 4 illustrates a pattern inspection apparatus constructed in accordance with the present invention.

In an exemplary implementation, a pattern inspection or defect detection apparatus 100, as shown in FIG. 4, can be constructed having a scanning electron-beam microscope (SEM) 102 used for viewing purposes, as is well known in the art. Although the invention is described herein as used during final wafer inspection of the IC dies, it can readily be appreciated that the invention has application to any other stage of manufacturing, e.g., inspection after the initial photomasking and baking of a wafer known as "development inspection," where critical dimension measurements or pattern inspections are contemplated.

The SEM 102 is provided with an object support structure 108 in the form of a stage or chuck, which may be moveable or stationary. An object 120 under evaluation such as an IC sample die or a wafer containing many IC dies rests on support structure 108. Under control of computer 110, the structure 108 may be moveable in two (X-Y) or three (X-Y-Z) dimensions to facilitate the proper viewing of the object 120 (or parts thereof). A deflector 104 and detector 106, whose operations will be described in detail below, are also provided within the SEM 102 to assist in the viewing of the object 120. An image processor 112, together with its accompanying image memory 114 are provided to process the image signals output by the SEM 102 and transform the signals into visual representations or data which can be viewed on a display monitor 116 (e.g., cathode ray tube (CRT)) or used for processing in computer 110.

In operation, the SEM 102 uses a finely focused electron beam directed by deflector 104, preferably under the control of the computer 110, to scan the surface of the object 120 resting on the support 108, typically in two dimensions (X-Y). For the purposes of discussion only, it will be assumed herein that the object 120 under evaluation is a silicon wafer having a plurality of contacts formed therein, such as contacts 50 illustrated in FIGS. 2, 3 and 8. The electrons striking the semiconductor surface of the object 120 collide with inner shell electrons of the object atoms causing inelastic collisions of low energy emitting so-called "secondary electrons" which are serially detected by the detector 106.

The detected electron current is output as an image signal to the computer 110 and image processor 112 where an image representative of the surface of the object 120 can be formed based on the image signal. This image may be stored in the image memory 114 and can be viewed on the monitor 116 or otherwise processed by the computer 110. The high resolution of the image is attributed to the small diameter (e.g., several nanometers) of the electron beam illuminator. The visual contrast achieved in the image originates mostly from variations in the extent of the secondary electron emissions from the topographic features of the surface of the object 120.

Figure 5:
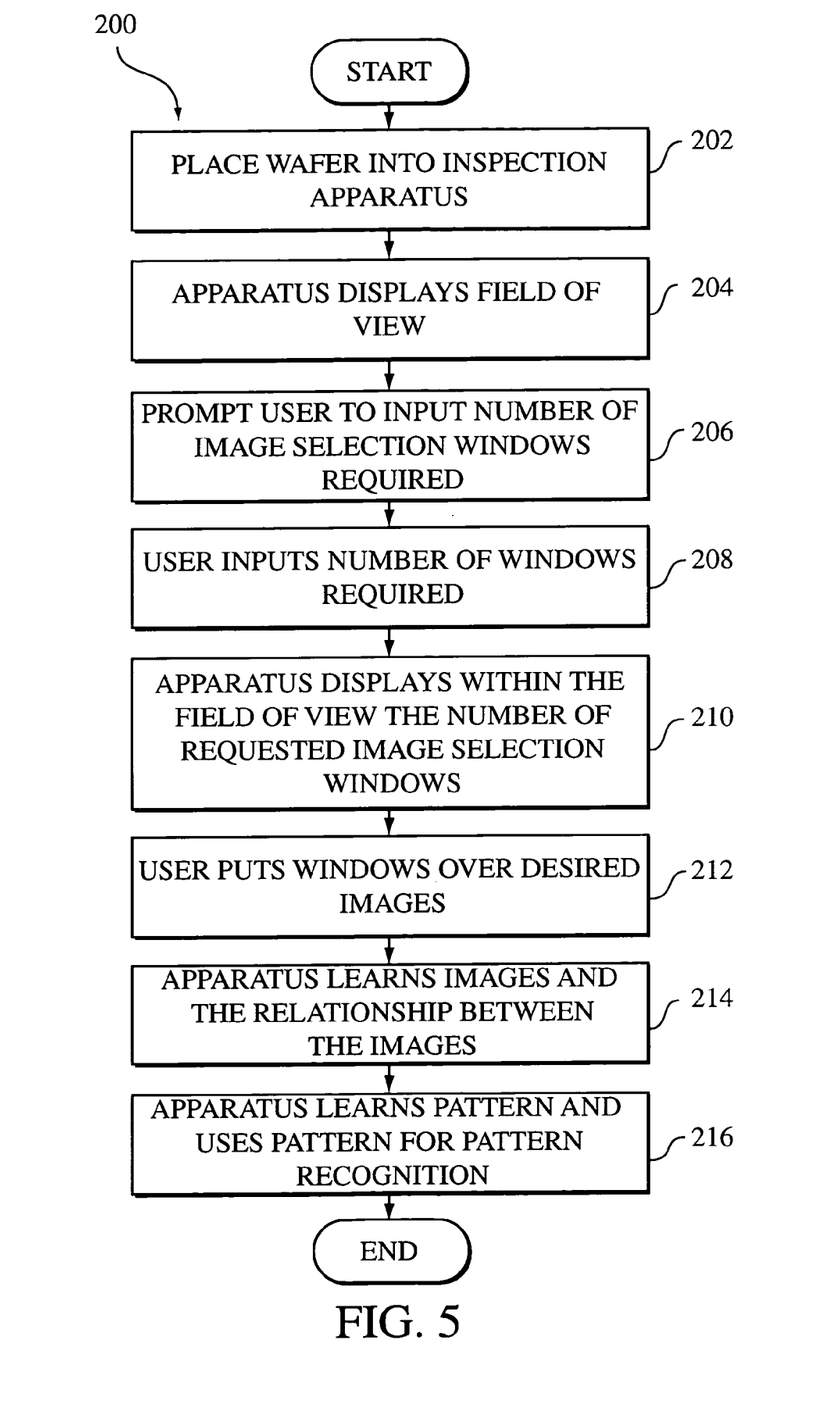
FIG. 5 illustrates in flowchart form an exemplary pattern recognition method using multiple images in accordance with a first embodiment of the present invention.

FIG. 5 illustrates an exemplary method 200 of using multiple images in a pattern recognition process constructed in accordance with an embodiment of the present invention. The method 200 (with the exception of step 202, described below) is preferably implemented in software and executed in the computer 110 of the pattern inspection apparatus 100 illustrated in FIG. 4. It should be noted that the method 200 of the present invention may also be implemented in a conventional CD-SEM apparatus such as the "IVS-200" made by IVS, Inc., the "Opal 7830si" made by Applied Materials, or the "S-8820/8620" made by Hitachi, by modifying the computer program used by the control computer within the CD-SEM apparatus such that the apparatus implements the operations of the method 200 (described below).

Referring to FIGS. 4 and 5, the method 200 begins when a user places a wafer or other object 120 to be inspected into the inspection apparatus 100 (step 202). It should be appreciated that the object 120 can be a semiconductor wafer at any stage of the manufacturing process or it can be a reticle used to create a mask, such as a phase shifting mask and that the invention should not be limited solely to wafers. However, to remain consistent with the preceding discussion, the object 120 will be a wafer having contacts formed therein. After scanning the wafer, the method 200 displays on the display 116 a field of view containing images from a portion of the scanned wafer (step 204). As noted above with reference to FIG. 1, theses images are to be inspected by the apparatus 100 and thus, are referred to herein as the "inspected images."

The apparatus 100 then prompts the user to input the number of image selection windows required (step 206). Each image selection window is used by the method 200 to select an image, within the inspected images, to be used as part of the pattern to be detected. In the prior art method one large box is used to obtain an image having both desired (e.g., bottom surfaces of contacts) and undesired features (e.g., top surfaces of contacts). The present method 200 uses multiple sizable image selection windows. This way, instead of placing one large box over an image containing both desired and undesired features, the method 200 uses several multiple sizable image selection windows to select images with only desired features. As will become apparent below, this allows the method 200 to substantially filter out undesired features from the pattern to be recognized and thus, the pattern recognition analysis.

At step 208, the user inputs the number of desired windows. By allowing the user to select more than one image selection window, the method 200 of the present invention allows multiple different images to be used in the pattern recognition analysis. It should be noted that these steps differ from the prior art, which only provides the user with one box, and thus, does not allow the user to select multiple images (see step 16 of FIG. 1). Moreover, the prior art does not filter out undesired features.

Referring also to FIGS. 9a–9e, the apparatus 100 displays the appropriate number of image selection windows 300, 302, 304 within the field of view (step 210). FIGS. 9a–9e illustrate an example where three image selection windows 300, 302, 304 have been chosen by a user at step 208. These windows 300, 302, 304 are used to select desired images 310a, 310b, 310c from the inspected images. The selection is made by placing each image selection window 300, 302, 304 over a separate desired image 310a, 310b, 310c that is currently displayed in the field of view (step 212). It should be understood that depending upon how the method 200 is implemented, the user may be required to hit a "select" or enter "button" after positioning and sizing the image selection windows 300. 302, 304 to select the images 310a, 310b, 310c. By using multiple image selection windows 300, 302, 304, the user can size them so that they only select desired features (e.g., bottom surfaces 54). That is, it is possible for the user to substantially filter out unwanted features, such as the top surfaces 52 of the contacts, from the pattern to be recognized at this step.

Figure 6A:
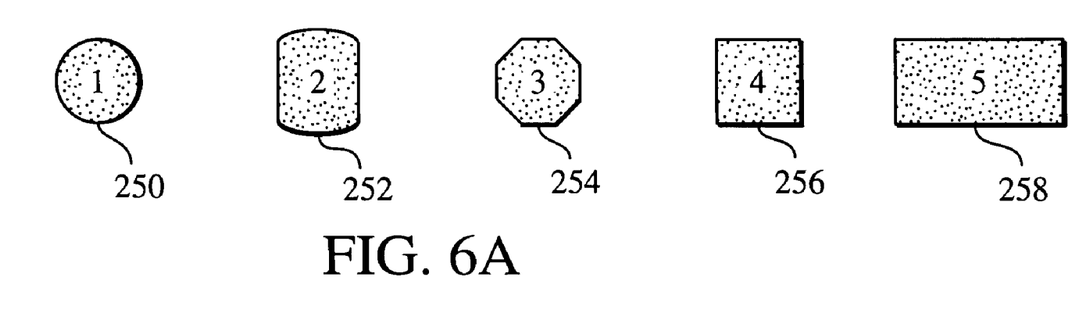
FIGS. 6a and 6b illustrate exemplary images to be detected and their relationships.
Figure 6B:
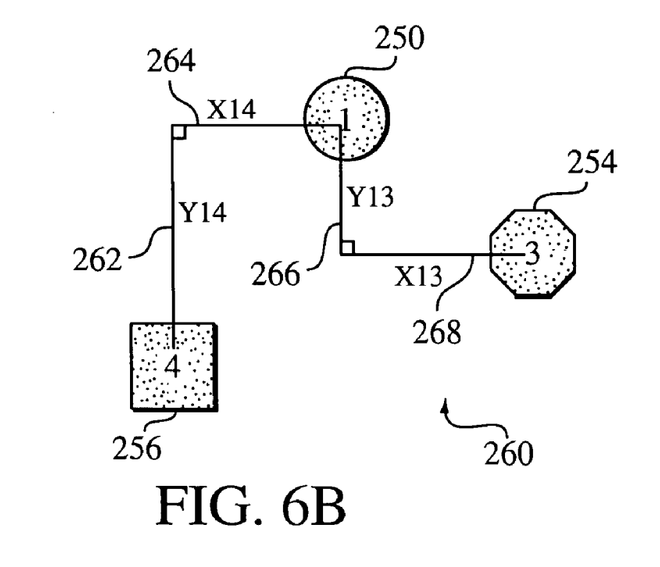
Figure 9A:
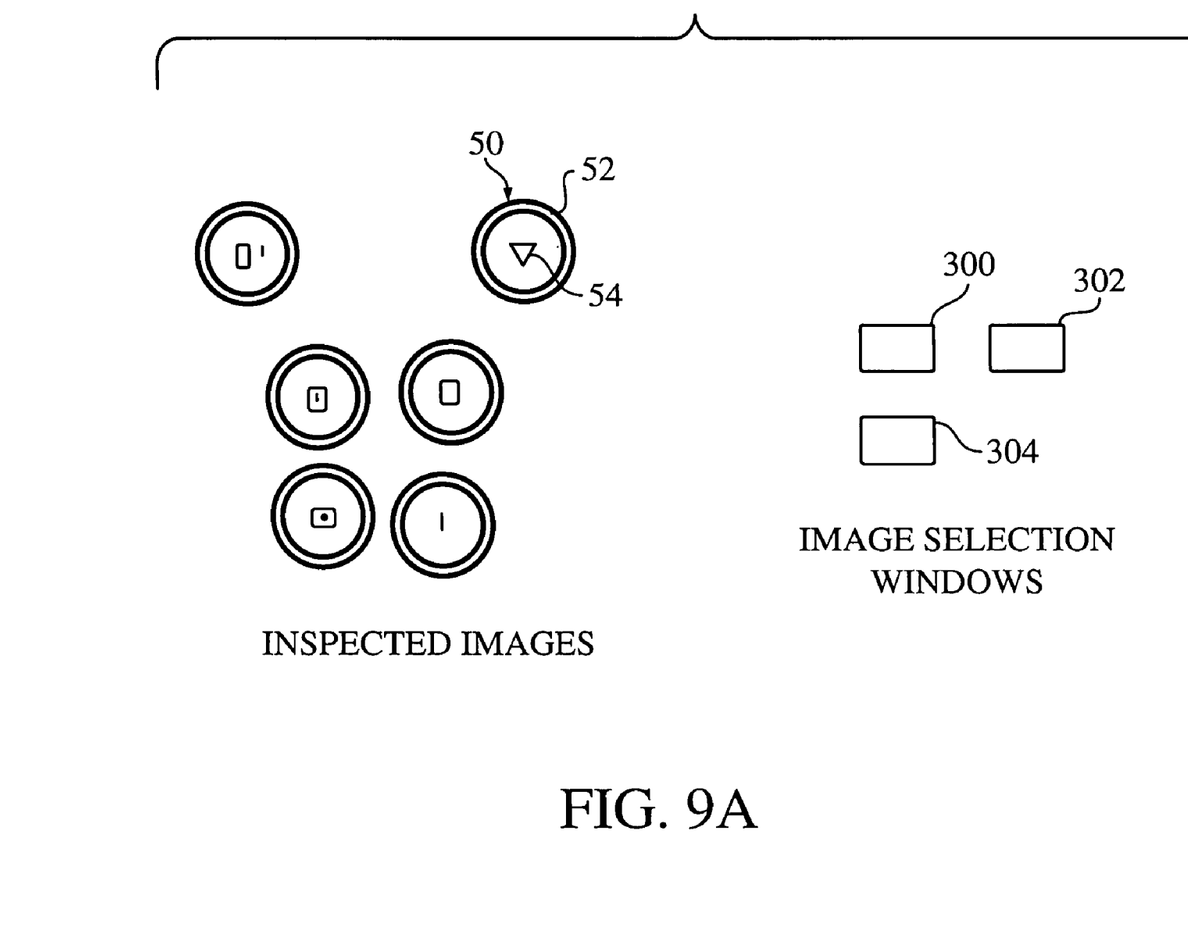
FIGS. 9a–9e illustrate sample field of view images and a resultant pattern to be recognized in accordance with any of the embodiments of the present invention.
Figure 9B:
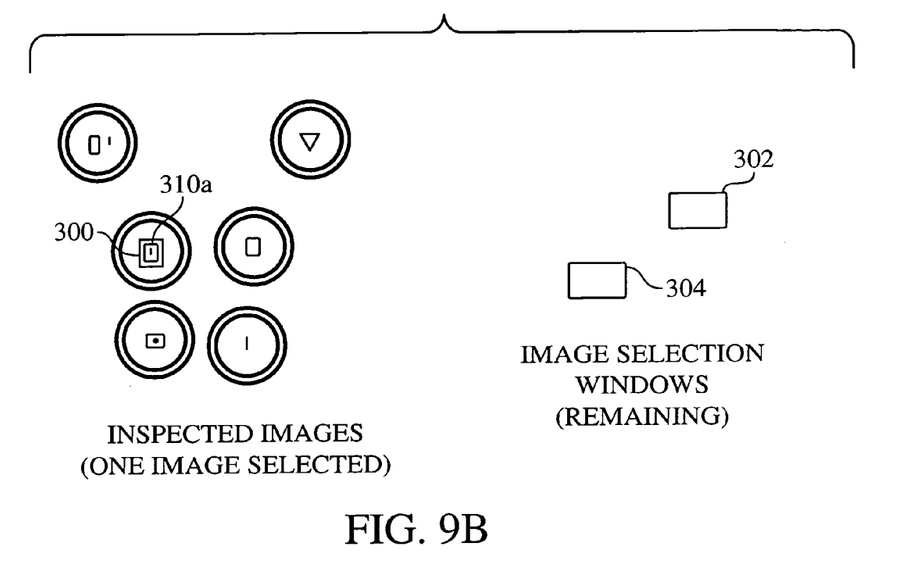
Figure 9C:
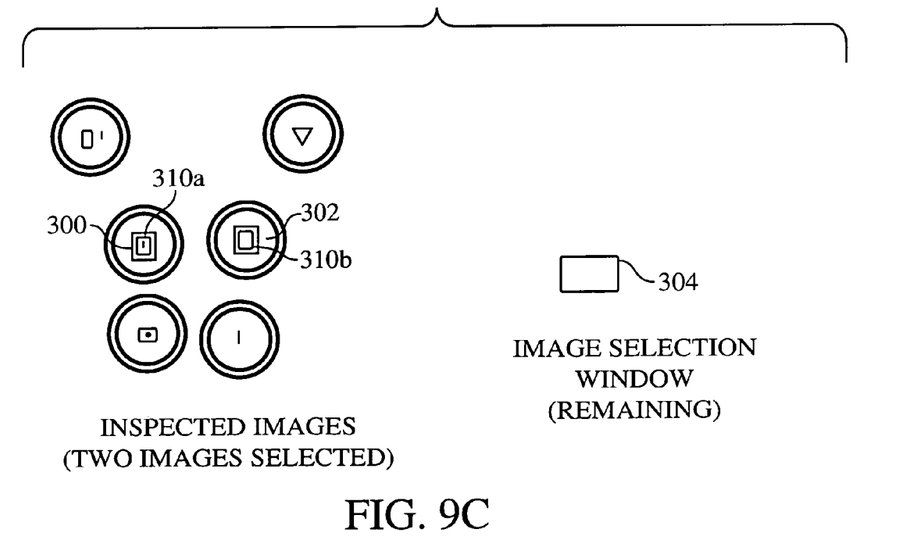
Figure 9D:
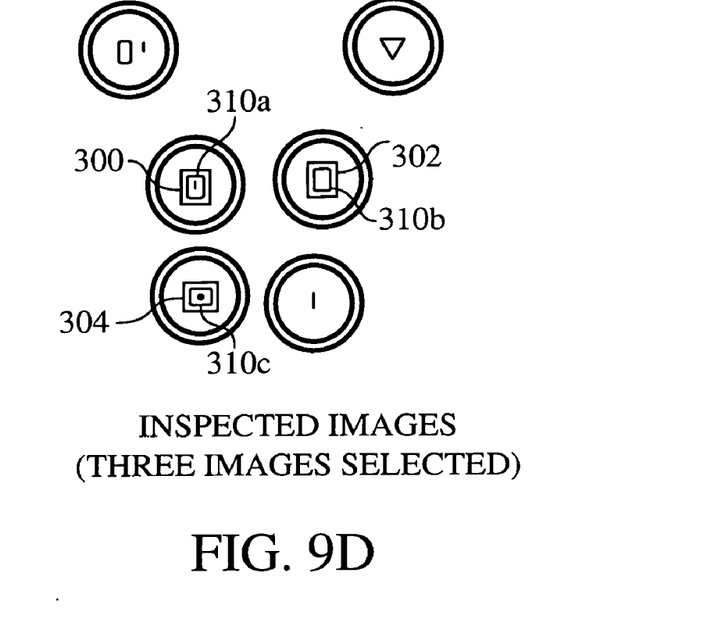
Figure 9E:
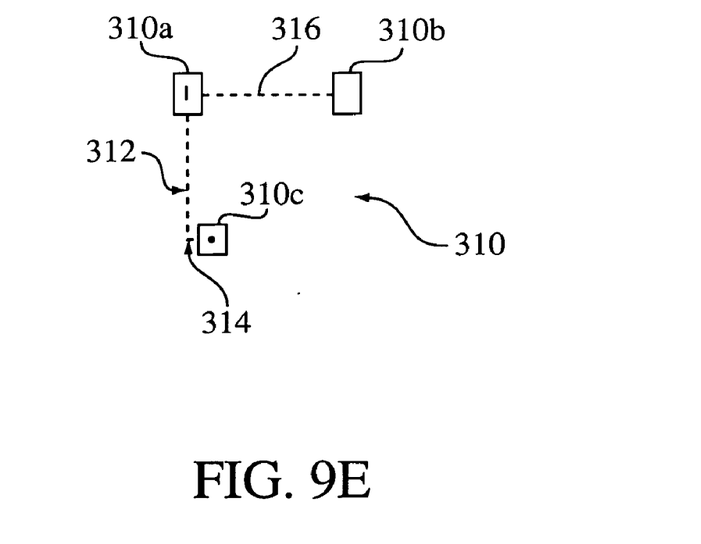

At step 214, the apparatus 100 learns the selected images and the relationship between them. That is, the apparatus 100 obtains and stores information for the selected images. The information can be stored in the memory 114 or other computer readable medium connected to or contained within the apparatus 100. The spatial relationship between the selected images is also obtained and stored. Learning the spatial relationship between the images will further filter out undesired features. This can best be illustrated by the following example. Referring to FIG. 6a, five exemplary images 250, 252, 254, 256, 258 are illustrated. These images 250, 252, 254, 256, 258 correspond to potential desired images within the inspected images. That is, these images 250, 252, 254, 256, 258 could represent the bottom surfaces of various contacts found on the object 120. Referring to FIG. 6b, it can be seen that a pattern 260 to be detected has been selected by a user. The pattern 260 consists of three selected images 250, 254, 256, the spatial relationship 266, 268 between image 250 and image 254 and the spatial relationship 262, 264 between image 250 and image 256. It is desired that the relationships 262, 264, 266, 268 be two or three dimensional vectors. It should be appreciated, however, that any means for indicating the relationship between the selected images can be used. Another indicia of the relationship between the images could include the distance from an origin or test point on the object 120 (not shown). FIG. 9e illustrates the pattern 310 to be recognized, the spatial relationships 312, 314 between images 310a and 310c and the spatial relationship between image 310a and 310b.

Referring again to FIGS. 4 and 5, once the images and their relationship are learned, the method 200 continues at step 216, where the pattern to be recognized is learned and subsequently used a pattern recognition analysis to determine if the object 120 has any defects. Here, unlike the prior art method 10 (FIG. 1), the learned pattern includes the learned information of the multiple images, the relationship between the images and any other information required by the apparatus 100 to perform the pattern recognition analysis. Any required pattern information can be stored in the memory 114 or other computer readable medium connected to or contained within the apparatus 100. At this point, the process of learning the pattern and performing the pattern recognition analysis can be carried out in any known manner.

Figure 7:
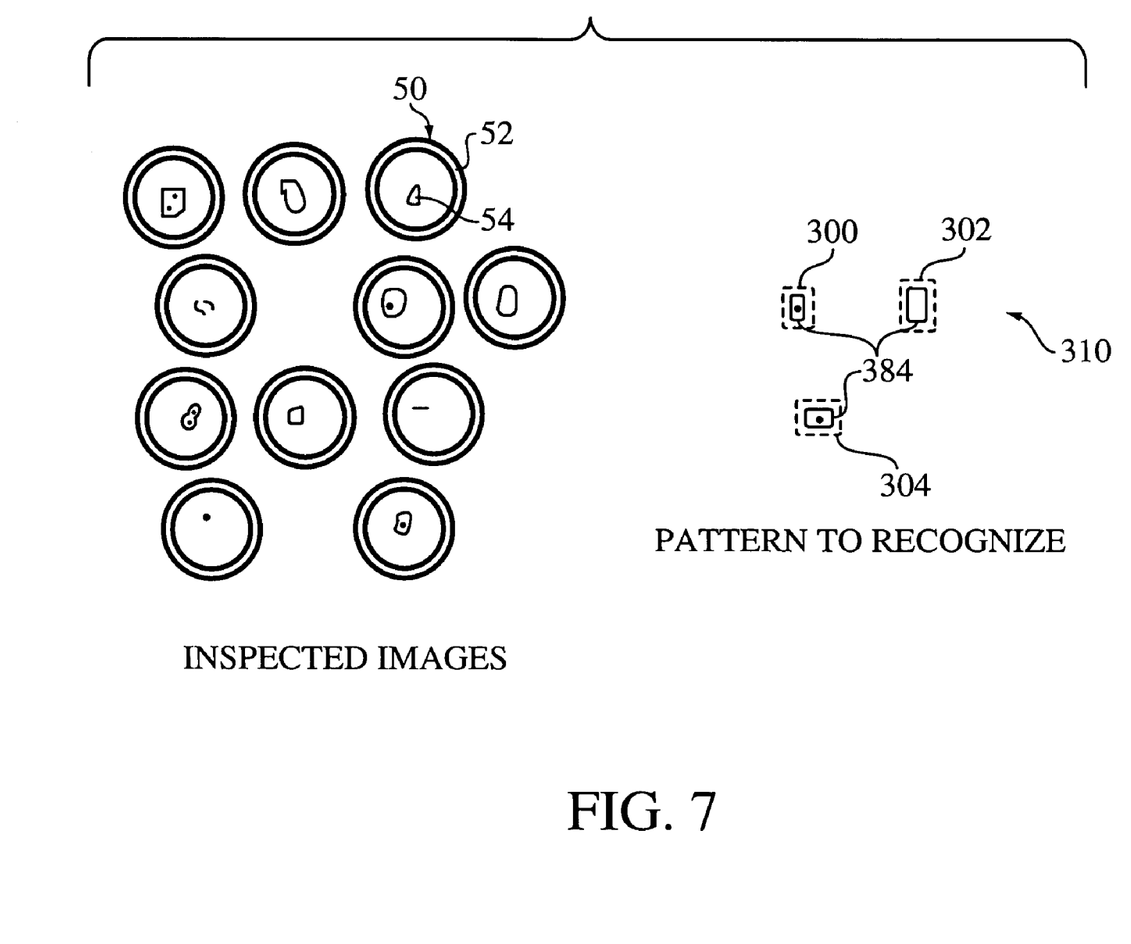
FIG. 7 illustrates exemplary inspected images and a pattern to be recognized used in the processes illustrated in FIGS. 5 and 8.

FIG. 7 illustrates the exemplary inspected images 50 described above with reference to FIG. 2. However, a new pattern 310 to be recognized is illustrated. As illustrated in FIGS. 9a–9e, the pattern 310 was created using the method 200 (FIG. 6) of the present invention. Unlike the pattern contained within box 70 of FIG. 2, the pattern 310 created in accordance with the present invention consists solely of images of the bottom surface 384 of the contacts. Each bottom surface 384 was individually selected by respective pattern windows 300, 302, 304. As described above, the present invention learns the individual images within these windows 300, 302, 304 and their relationships (FIG. 9e). By learning the images 384 and their relationship, the learned pattern 310 to be recognized is devoid of any undesired features, particularly the top surfaces 52, 82 (illustrated in FIG. 2). As such, the present invention using pattern 310 detects zero matches from the inspected images 50. This is the correct result, since none of the bottom surfaces 54 within the inspected images match the bottom surfaces 384 of the pattern 310 to be recognized.

Figure 8:
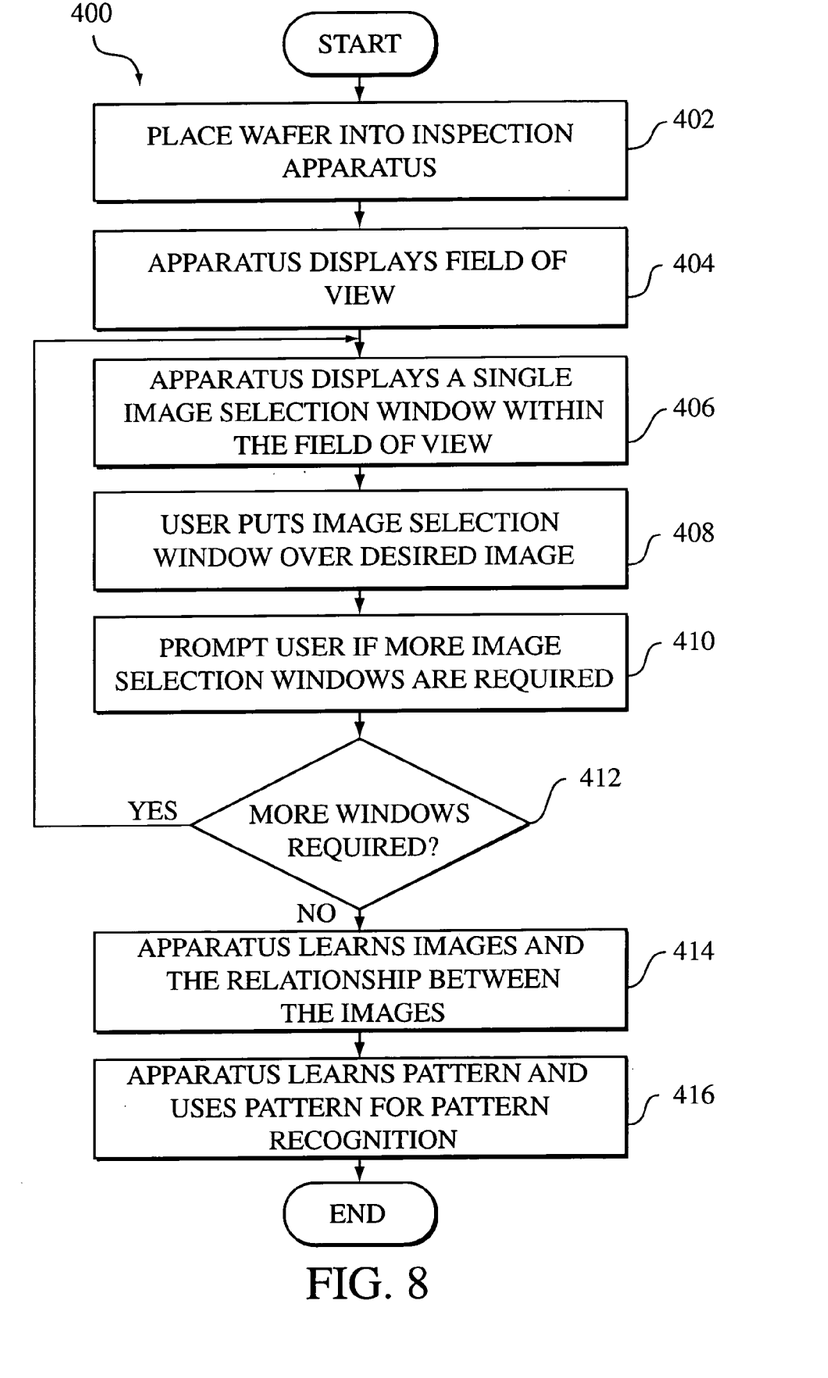
FIG. 8 illustrates in flowchart form another exemplary pattern recognition method using multiple images in accordance with a second embodiment of the present invention.

FIG. 8 illustrates another exemplary method 400 of using multiple images in a pattern recognition process constructed in accordance with another embodiment of the present invention. The method 400 (with the exception of step 402, described below) is preferably implemented in software and executed in the computer 110 of the pattern inspection apparatus 100 illustrated in FIG. 4. As with the method 200 (FIG. 5), the method 400 may also be implemented in a conventional CD-SEM apparatus such as the "IVS-200" made by IVS, Inc., the "Opal 7830si" made by Applied Materials, or the "S-8820/8620" made by Hitachi, by modifying the computer program used by the control computer within the CD-SEM apparatus such that the apparatus implements the operations of the method 400 (described below).

Referring to FIGS. 4 and 8, the method 400 begins when a user places a wafer or other object 120 to be inspected into the inspection apparatus 100 (step 402). After scanning the wafer, the method 400 displays on the display 116 a field of view containing images from a portion of the scanned wafer (step 404). As noted above, these images are referred to as the inspected images. The apparatus 100 then displays an image selection window within the field of view (step 406). At step 408 the user uses the window to select a desired image from the inspected images. The selection is made by placing the image selection window over an image that is currently displayed in the field of view. It should be understood that depending upon how the method 400 is implemented, the user may be required to hit a "select" or enter "button" after positioning and sizing the window to select the image. At step 410, the user is prompted to determine if more image selection windows are required.

If at step 412, it is determined that more image selection windows are required, the method 400 continues at step 406 where a new image selection window is displayed on the field of view. This way, the user may select multiple images using multiple image selection windows. By using multiple image selection windows, the user can size these windows so that they only select desired features. That is, it is possible for the user to substantially filter out unwanted features, such as the top surfaces of the contacts, from the pattern to be recognized.

If at step 412 it is determined that no more image selection windows are required, the method continues at step 414. At step 414, the apparatus 100 learns the selected images and the relationship between them. That is, the apparatus 100 obtains and stores information for the selected images. The information can be stored in the memory 114 or other computer readable medium connected to or contained within the apparatus 100. The spatial relationship between the selected images is also obtained and stored (as described above with reference to FIG. 6). Once the images and their relationship are learned, the method 400 continues at step 416, where the pattern to be recognized is learned and subsequently used a pattern recognition analysis to determine if the object 120 has any defects. Here, unlike the prior art method 10 (FIG. 1), the learned pattern includes the learned information of the multiple images, the relationship between the images and any other information required by the apparatus 100 to perform the pattern recognition analysis. Any required pattern information can be stored in the memory 114 or other computer readable medium connected to or contained within the apparatus 100. At this point, the process of learning the pattern and performing the pattern recognition analysis can be carried out in any known manner.

The present invention improves the pattern recognition process by allowing the user to create a pattern to be recognized using multiple images. By select multiple images, the user can substantially filter out unwanted features, such as the top surfaces of contacts formed in a wafer. More importantly, the present invention uses relationships between the selected images to hone in on the exact pattern to be recognized. Thus, the present invention can perform pattern recognition using the typical thresholds currently used in today's inspection systems, but with substantially better results.

It should be appreciated that the learned pattern created by the methods of the present invention can be used in the pattern recognition analysis to detect defects in the object as well as to detect desired (i.e., properly etched) patterns in the object. It should also be appreciated that the learned pattern created by the methods of the present invention can be used in both pattern recognition and critical dimension (CD) analysis processes. Moreover, the methods of the present invention can be used to inspect wafers, reticles or other semiconductor devices requiring pattern inspection/recognition.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of operating an inspection apparatus to inspect a device used in a manufacturing process, said method comprising the steps of:
   scanning the device;
   displaying a plurality of images corresponding to respective scanned areas of the device;
   inputting at least two desired scanned images to be inspected that have been selected by a user of the inspection apparatus, the desired scanned images being selected from the images corresponding to the scanned areas of the device;
   deriving a spatial relationship between the input desired scanned images; and
   forming a pattern to be recognized on the device from the input desired scanned images and the derived spatial relationship.

2. The method of claim 1 further comprising the step of storing information associated with the input desired scanned images and the derived spatial relationship on a computer readable medium of the inspection apparatus.

3. The method of claim 2 further comprising using said stored input desired scanned images and the stored derived spatial relationship in a pattern recognition analysis to detect defects in the device.

4. The method of claim 2 further comprising using said stored input desired scanned images and the stored derived spatial relationship in a pattern recognition analysis to detect desired patterns in the device.

5. The method of claim 1 wherein said inputting step comprises:
   displaying at least two image selection windows with the displayed images; and
   inputting data corresponding to the input desired scanned images in response to the user placing the at least two image selection windows over respective displayed images.

6. The method of claim 5 wherein the image selection windows are placed over images corresponding to properly formed areas of the device.

7. The method of claim 5 wherein the image selection windows are placed over images corresponding to defectively formed areas of the device.

8. The method of claim 5 wherein the user of the apparatus is prompted for a number of image selection windows to be displayed.

9. The method of claim 1 wherein said inputting step comprises:
   displaying an image selection window with the displayed images;
   inputting data corresponding to one of the input desired scanned images in response to the user placing the image selection window over a displayed image;
   determining if another image selection window is required; and
   if another image selection window is required, repeating said steps of displaying an image selection window, inputting data corresponding to one of the input desired scanned images and determining if another image selection window is required.

10. The method of claim 9 wherein the image selection windows are placed over images corresponding to properly formed areas of the device.

11. The method of claim 9 wherein the image selection windows are placed over images corresponding to defectively formed areas of the device.

12. The method of claim 1 wherein the device is a semiconductor wafer.

13. The method of claim 12 wherein the areas are contacts formed in the wafer.

14. The method of claim 13 wherein the contact areas have desired and undesired features and said inputting step comprises:
   displaying at least two image selection windows with the displayed images; and
   inputting data corresponding to the input desired scanned images in response to the user placing the at least two image selection windows over images associated with the desired features of the contact areas.

15. The method of claim 13 wherein the contact areas have desired and undesired features and said inputting step comprises:
   displaying at least two image selection windows with the displayed images; and
   inputting data corresponding to the input desired scanned images in response to the user placing the at least two image windows over images associated with the undesired features of the contact areas.

16. The method of claim 13 wherein the contact areas have desired and undesired features and said inputting step comprises:
   displaying an image selection window with the displayed images;
   inputting data corresponding to one of the input desired scanned images in response to the user placing the image selection window over an image associated with the desired feature of a contact area;
   determining if another image selection window is required; and
   if another image selection window is required, repeating said steps of displaying an image selection window, inputting data corresponding to one of the input desired scanned images and determining if another image selection window is required.

17. The method of claim 1 wherein the device is a reticle.

18. The method of claim 1 wherein the derived spatial relationship comprises respective spatial relationships between pairs of the input desired scanned images.

19. A method of inspecting a semiconductor wafer having objects formed therein, said method comprising the steps of:
   scanning the wafer;
   displaying a plurality of images corresponding to respective scanned areas in the wafer;
   selecting at least two of the plurality of displayed images based on at least one selection of a desired scanned image by a user of an inspection apparatus;
   deriving a relationship between the selected images, the derived relationship being determined by forming vectors in at least two dimensions between the selected images; and
   forming a pattern to be recognized on the wafer from the selected images and the derived relationship.

20. The method of claim 19 further comprising the step of storing information associated with the selected images and the derived relationship on a computer readable medium of the inspection apparatus.

21. The method of claim 20 further comprising using said stored selected images and the stored derived relationship in a pattern recognition analysis to detect defects in the wafer.

22. The method of claim 20 further comprising using said stored selected images and the stored derived relationship in a pattern recognition analysis to detect desired patterns in the wafer.

23. A method of inspecting a semiconductor device having objects formed therein, said method comprising the steps of:
scanning the device to obtain scanned object images;
selecting at least two of the scanned object images; and
forming a pattern to be recognized on the device from the selected images and a spatial relationship between the images, the spatial relationship being determined by forming vectors in at least two dimensions between the selected images, wherein features that are not to be included in the pattern to be recognized are filtered out during said selecting step.

24. An inspection apparatus for use in inspecting a manufacturing device used in a manufacturing process, said apparatus comprising:
a scanning device, said scanning device obtaining images of the manufacturing device;
a display;
an input device to be manipulated by a user for selecting desired features of an image to be inspected; and
a processor coupled to said scanning device, said display and said input device, said processor controlling said scanning device to scan the manufacturing device, said processor displaying on said display a plurality of images corresponding to respective scanned areas of the manufacturing device, said processor inputting at least two user selected desired scanned images from the input device, said user selected images corresponding to scanned images displayed on the display, deriving a spatial relationship between the user selected images and forming a pattern to be recognized on the manufacturing device from the user selected images and the derived spatial relationship.

25. The apparatus of claim 24 further comprising:
a computer readable storage medium coupled to said processor, wherein said processor stores information associated with the user selected images and the derived spatial relationship on said computer readable medium.

26. The apparatus of claim 25 wherein said stored selected images and the stored derived spatial relationship are used by the processor in a pattern recognition analysis to detect defects in the manufacturing device.

27. The apparatus of claim 25 wherein said stored selected images and the stored derived spatial relationship are used by the processor in a pattern recognition analysis to detect desired patterns in the manufacturing device.

28. The apparatus of claim 24 wherein said processor inputs the user selected images by displaying on said display at least two image selection windows with the displayed images and inputting data corresponding to images selected by the user by placement of the selection windows via said input device.

29. The apparatus of claim 28 wherein the user of the apparatus is prompted for a number of images windows to be displayed.

30. The apparatus of claim 24 wherein said processor inputs the user selected images by displaying an image selection window on said display with the displayed images, inputting data corresponding to images selected by the user by placement of the image selection windows via said input device, determining if another image selection window is required, and if another image selection window is required, continuing to display an image selection window, inputting data and determining if another window is required until no further windows are required.

31. The apparatus of claim 24 wherein the manufacturing device is a semiconductor wafer.

32. The apparatus of claim 31 wherein the areas are contact areas formed in the wafer.

33. The apparatus of claim 24 wherein the manufacturing device is a reticle.

34. The apparatus of claim 24 wherein the derived spatial relationship comprises respective spatial relationships between pairs of the selected images.

35. An inspection apparatus for use in inspecting a semiconductor wafer, said apparatus comprising:
a scanning device, said scanning device obtaining images of a wafer;
a display;
an input device for use by a user of the apparatus for selecting desired features of an image to be inspected; and
a processor coupled to said scanning device, said display and said input device, said processor controlling said scanning device to scan a wafer, said processor displaying on said display a plurality of images corresponding to areas of the scanned wafer, said processor inputting at least two user selected images from the input device, deriving a relationship between the user selected images and forming a pattern to be recognized on the scanned wafer from the user selected images and the derived relationship, wherein the derived relationship is determined by forming vectors in at least two dimensions between the user selected images.

36. The apparatus of claim 35 further comprising:
a computer readable storage medium coupled to said processor, wherein said processor stores information associated with the selected images and the derived relationship on said computer readable medium.

37. The apparatus of claim 36 wherein said stored selected images and the stored derived relationship are used by the processor in a pattern recognition analysis to detect defects in the scanned wafer.

38. The apparatus of claim 36 wherein said stored selected images and the stored derived relationship are used by the processor in a pattern recognition analysis to detect desired patterns in the scanned wafer.

39. An inspection apparatus for use in inspecting a semiconductor wafer, said apparatus comprising:
a scanning device, said scanning device obtaining images of a wafer;
an input device for use by a user of the apparatus for selecting desired features of an image to be inspected; and
a processor coupled to said scanning device and said input device, said processor controlling said scanning device to scan a wafer, said processor inputting at least two user selected images from the input device and forming a pattern to be recognized on the scanned wafer from the user selected images and a spatial relationship between the images, wherein the derived relationship is determined by forming vectors in at least two dimensions between the user selected images.

* * * * *